United States Patent
Kim et al.

(10) Patent No.: US 10,949,962 B2
(45) Date of Patent: Mar. 16, 2021

(54) X-RAY DETECTING TYPE OF A COMPONENT COUNTER AND A METHOD FOR COUNTING COMPONENTS USING THE SAME

(71) Applicant: XAVIS CO., LTD, Seongnam-si (KR)

(72) Inventors: Hyeong-Cheol Kim, Seongnam-si (KR); Bong-Jin Choi, Seongnam-si (KR); Yong-Han Jang, Seongnam-si (KR)

(73) Assignee: XAVIS CO., LTD, Seongnam-si (KR)

( * ) Notice: Subject to any disclaimer, the term of this patent is extended or adjusted under 35 U.S.C. 154(b) by 107 days.

(21) Appl. No.: 16/253,650

(22) Filed: Jan. 22, 2019

(65) Prior Publication Data

US 2020/0234431 A1    Jul. 23, 2020

(51) Int. Cl.
| | | |
|---|---|---|
| *G06T 7/00* | (2017.01) |
| *G01N 23/04* | (2018.01) |
| *G01V 8/10* | (2006.01) |
| *G06M 7/00* | (2006.01) |
| *G06T 7/136* | (2017.01) |
| *G06K 9/46* | (2006.01) |
| *G06T 7/73* | (2017.01) |
| *G06N 20/00* | (2019.01) |

(52) U.S. Cl.
CPC .......... *G06T 7/0008* (2013.01); *G01N 23/04* (2013.01); *G01V 8/10* (2013.01); *G06K 9/46* (2013.01); *G06M 7/00* (2013.01); *G06T 7/136* (2017.01); *G06N 20/00* (2019.01); *G06T 7/73* (2017.01); *G06T 2207/10116* (2013.01); *G06T 2207/20081* (2013.01); *G06T 2207/30141* (2013.01); *G06T 2207/30148* (2013.01); *G06T 2207/30242* (2013.01)

(58) Field of Classification Search
CPC ......... G06T 7/0008; G06T 7/136; G06T 7/73; G06T 2207/10116; G06T 2207/20081; G06T 2207/30141; G06T 2207/30148; G06T 2207/30242; G01N 23/04; G01V 8/10; G06K 9/46; G06M 7/00; G06N 20/00
See application file for complete search history.

(56) References Cited

U.S. PATENT DOCUMENTS

| | | | | |
|---|---|---|---|---|
| 2015/0170002 A1* | 6/2015 | Szegedy | ............... | G06K 9/4628 |
| | | | | 382/156 |
| 2016/0169818 A1* | 6/2016 | Martin | .................. | H01L 23/544 |
| | | | | 702/81 |
| 2017/0354071 A1* | 12/2017 | Ikeda | ................. | H05K 13/0419 |

FOREIGN PATENT DOCUMENTS

| | | | | |
|---|---|---|---|---|
| KR | 101430965 | | 8/2014 | |
| KR | 101439245 | | 9/2014 | |
| WO | WO-2015170791 A1 * | 11/2015 | ............. | G01R 31/26 |

* cited by examiner

*Primary Examiner* — Zhitong Chen
(74) *Attorney, Agent, or Firm* — Cantor Colburn LLP

(57) ABSTRACT

Provided is an x-ray detecting type of a component counter and a method for counting components using the same. The component counter includes: an image obtaining module to obtain an image of an object with an x-ray tube and a flat detector; an inputting frame located at the front of the image obtaining module and having a guiding surface; a transferring tray to move between the image obtaining module and the inputting frame along a moving guide installed at the guiding surface; and a foreign object sensor displaced at the inputting frame to detect a foreign object; wherein the detector has a horizontal section to corresponding to an investigating surface of the transferring tray.

5 Claims, 5 Drawing Sheets

X-RAY DETECTING TYPE OF A COMPONENT COUNTER AND A METHOD FOR COUNTING COMPONENTS USING THE SAME

BACKGROUND OF THE INVENTION

1. Field of the Invention

The present invention relates to an x-ray detecting type of a component counter and a method for counting components using the same, in particular the component counter for detecting components on a reel of a component tape or components on a printed circuit board to count the number of the components and the method for counting the components contained in the reel of the component tape or the printed circuit board using the same.

2. Description of the Related Art

An electric component installed on a printed circuit board of an electric device can be delivered to a pick-up position in a state of being adhered on a component tape by a tape feeder. The component tape may be wounded on a reel before being transferred by the tape feeder. It is necessary for a component adhesive state on the component tape to be investigated before delivery. And the number of the components on the reel has to be countered during the investigation. The investigation for counting the number of the components may be required in various processes for manufacturing an electric device. Korean Patent registration number 10-1439245 discloses an apparatus for counting the number of components in a semiconductor tape reel. And also Korean Patent registration number 10-1430965 discloses a method for counting chips in a tape reel. But the known apparatus and the method disclosed in the above prior arts has complicated structure and process such as line scanning for detecting the chips in the reel. And, also, the prior arts disclose no detailed process for counting the chips. Therefore, there is a need for an apparatus or a method for counting the number of components in the tape reel or a printed circuit board in a simple and easy way and without error.

PURPOSE OF THE INVENTION

The purpose of the present invention is to provide with an x-ray detecting type of a component counter and a method for counting components in a tape reel or a printed circuit board so as to have a simple structure and easy process and count the components without error.

SUMMARY OF THE INVENTION

In one embodiment of the present invention, an x-ray detecting type of a component counter comprises an image obtaining module to obtain an image of an object with an x-ray tube and a flat detector; an inputting frame located at the front of the image obtaining module and having a guiding surface; a transferring tray to move between the image obtaining module and the inputting frame along a moving guide installed at the guiding surface; and a foreign object sensor displaced at the inputting frame to detect a foreign object; wherein the detector has a horizontal section to corresponding to an investigating surface of the transferring tray.

In another embodiment of the present invention, the x-ray tube is secured at a position regulating bracket, and the foreign object is displaced on the investigating surface at least a portion of which is made of a polymer material.

In another embodiment of the present invention, the component counter further comprises a driving means to move the transferring tray at which a distortion protecting axle extending along a transverse direction is installed.

In still another embodiment of the present invention, a method for counting the number of components using x-ray image comprises obtaining an x-ray image; compensating the x-ray image; forming a plural of divided areas from the x-ray image, and labeling each divided area; extracting a feature from each area for distinguishing a component; verifying the feature of a component or components by calling a component identifying data; and counting components according to a result of the verifying.

In still another embodiment of the present invention, the divided areas are made by means of binarization.

In still another embodiment of the present invention, the component identifying data is formed using big data learning resources for various component positioning shapes.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Exemplary embodiments of the present invention will be described herein below with reference to the accompanying drawings.

Figure 1:
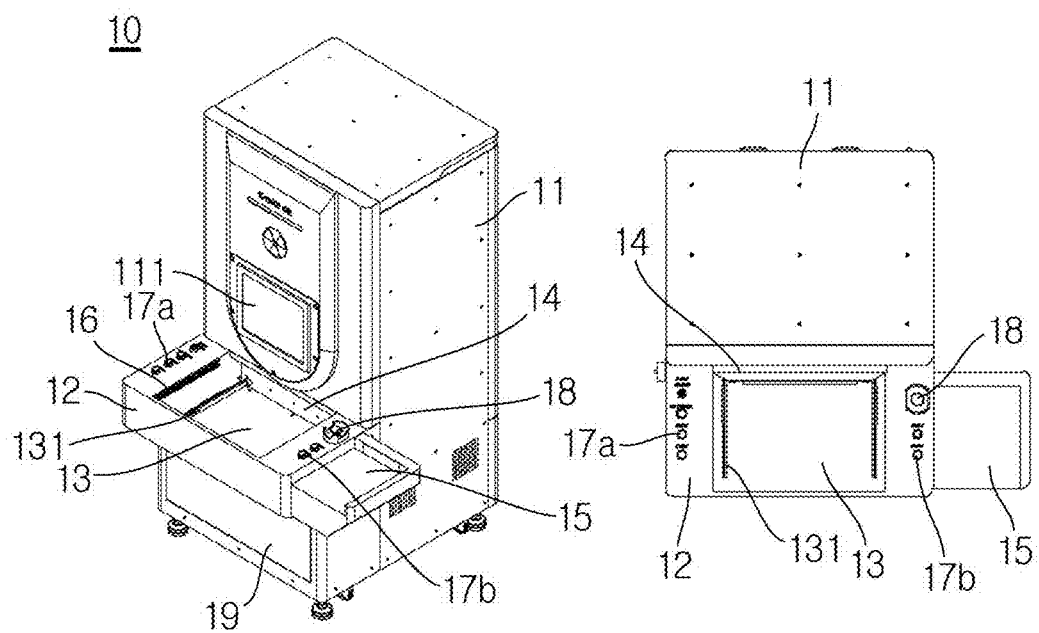
FIG. 1 shows an x-ray detecting type of a component counter according to an embodiment of the present invention.

FIG. 1 shows an x-ray detecting type of a component counter according to an embodiment of the present invention.

Referring FIG. 1, an x-ray detecting type of a component counter comprises an image obtaining module 11 to obtain an image of an object with an x-ray tube and a flat detector; an inputting frame 12 located at the front of the image obtaining module 11 and having a guiding surface 13; a transferring tray to move between the image obtaining module 11 and the inputting frame 12 along a moving guide installed 131 at the guiding surface 13; and a foreign object sensor 16 displaced at the inputting frame 12 to detect a foreign object; wherein the detector has a horizontal section to corresponding to an investigating surface of the transferring tray.

The x-ray detecting type of a component counter may be used for detecting very small electric components that are difficult to be investigated with an eye or an optical device, and for counting the total number of the components or for verifying its positioning state. The electric components may be stored in a component pocket formed at a component tape that may be wound in a circular reel. And also, a plural of electric components may be displaced in a concentrated state on a printed circuit board. The electric components in the reel or on the board cannot be checked exactly with respect to the number of components in the reel or whether a component may be secured correctly in a predetermined position or not. The component counter can be used for counting the number of components in the reel or for checking a position of each component in the board without error and with rapidity. In particular, the component counter can be used for countering chips in real time in a course of processing.

The image obtaining module 11 may be formed in an enclosed volume, and may comprise a plural of vertical members, horizontal members and walls secured by the members. The x-ray tube and a detector are displaced within the enclosed volume for obtaining an x-ray image of an investigated object. The detector may become a flat detector having a flat sensing surface, thereby the x-ray image of the can be obtained in an equal or similar condition regardless of the position of the investigated object. A cone beam type x-ray from the x-ray tube can be emitted to the investigated object, and then can be detected by the detector. The x-ray image of the object can be obtained by one time operation. The inputting frame 12 may be displaced at a front of the image obtaining module 11, and the inputting frame 12 may have a shape of a box with its upper surface open. The moving guide 131 may be formed at both sides of the guiding surface 13 for moving the transferring tray. The transferring tray can be moved from the guiding surface 13 to the image obtaining module 11 and vice versa along the moving guide 131. If the transferring tray is moved at the guiding surface 13, the investigated object such as a reel or a printed circuit board can be located on the transferring tray. The foreign object sensor 16 extending in a form of straight line along both walls of the inputting frame 12 having a groove structure with a rectangular section may be installed. The foreign object sensor 16 may extend from a front part of the inputting frame 12 to an adjacent part of a front wall of the image obtaining module 11 along the opposite side walls of the inputting frame 12 in a form of a straight line, and may sense the investigated object moving to the guiding surface 13 to be located at the transferring tray. And also, the foreign object sensor 16 can sense a foreign object within the inputting frame 12, for example a hand of a man or a means to transfer the investigated object. The foreign object sensor 16 may become an optical sensor or the like, and an information sensed by the foreign object sensor 16 can be sent to a controller. If the other object than the investigated object is detected within the inputting frame 12, then the movement of the transferring tray can be interrupted for a while.

The investigating tray can move manually or automatically. An operating means 17a, 17b may be installed at both sides of the inputting frame 12, and the operating means 17a, 17b may comprise moving buttons for inputting or outputting the investigating tray. The operating buttons installed at both sides of the inputting frame 12 may be pressed at the same time for moving the transferring tray. Optionally an emergence suspending button 18 may be installed at adjacent place of the operating means 17a, 17b, and the total operation of the component counter 10 may be halted by pressing the suspending button 18. A printing table 18 may be installed at one side of the inputting frame 12 for displacing a label printer. The label printer can print some information related to the investigated object after investigating to attach the printed label on the investigated object. Various kind of printers can be displaced on the printing table 18, and can be connected to the component counter for communicating information related to the investigated object. An assistant module 19 may be installed under the inputting frame 12. The assistant module 19 may have a hardware for operating the component counter 10 or a data storing media. The assistant module 19 may receive necessary information related to the investigated component from an internet server. And the assistant module 19 may have a controller for controlling the operation of the component counter 10 and have a computer program for counting the number of the components. The assistant module 19 may have various functions for aiding the operation of the component counter 10.

A shielding door 14 may be installed at a boarding part between the image obtaining module 11 and the inputting frame 12 to prevent some x-ray in a course of operating the x-ray tube from leaking out of the image obtaining module 11. The shielding door 14 may be closed when the transferring tray moves into the image obtaining module 11 to be displaced in a predetermined position. And the shielding door 14 can be opened for exiting the transferring tray after finishing the investigation. The x-ray image for investigating the object with the components can be obtained when the transferring tray with the object is displaced at the predetermined position and the shielding door 14 is closed. The inner structure of the component counter will be discussed in the following.

Figure 2:
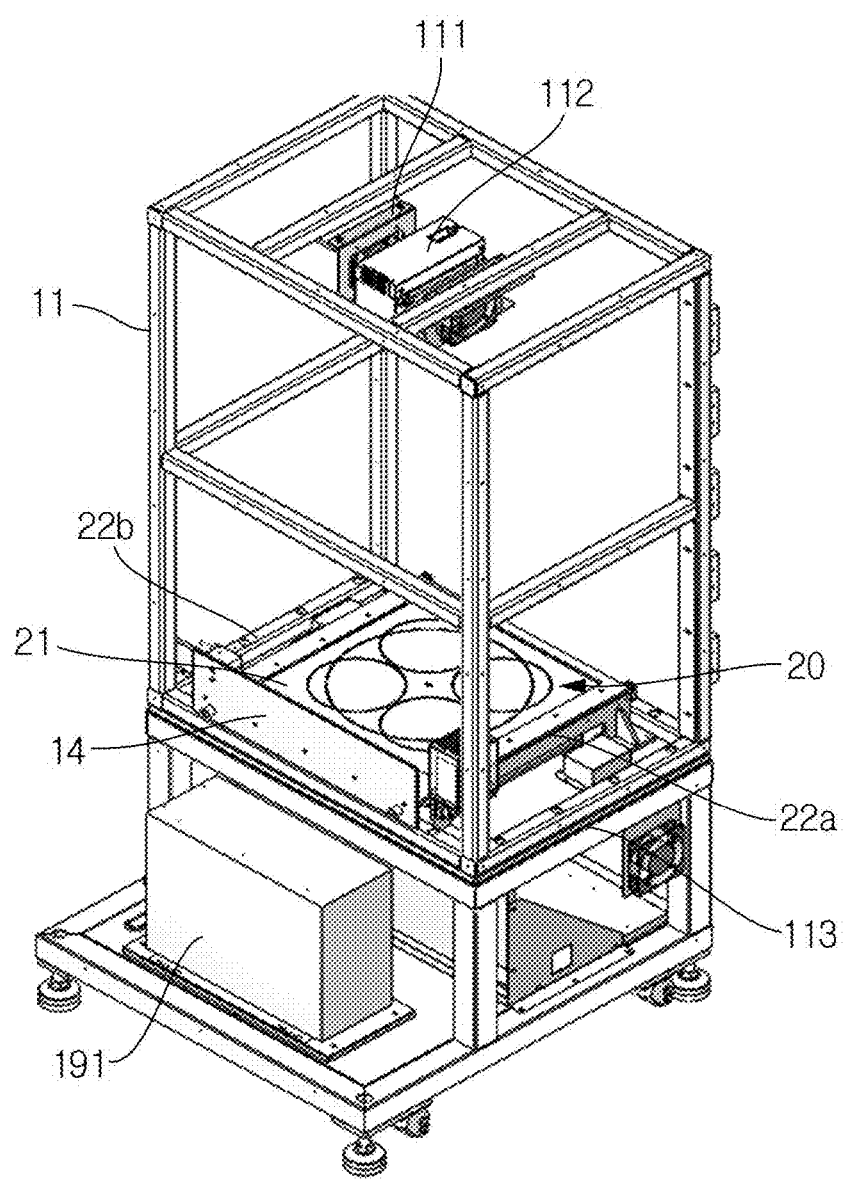
FIG. 2 shows an inner structure of the component counter according to an embodiment of the present invention.

FIG. 2 shows an inner structure of the component counter according to an embodiment of the present invention.

Referring FIG. 2, the x-ray tube 112 is secured at a position regulating bracket 111, and an investigated object is displaced on an investigating surface 21 of the transferring tray 20, at least a portion of which is made of a polymer material.

The transferring tray 20 may move into or out of the image obtaining module 11 in a sliding way or the like. The transferring tray 20 may have a shape of a rectangular flat, and move into or out of the image obtaining module 11 through an inputting hole having a rectangular shape and being opened or closed by the shielding door 14. The transferring tray 20 may comprise a peripheral part and the investigating surface 21 formed within the peripheral part. The investigating surface 21 may have a rectangular shape made of a polymer material such as a poly ethylene, a poly acrylic, a ploy carbonate, a poly propylene or the like. Advantageously the investigating surface 21 may have a transmission property different from that of a component to be investigated, and have a structure to be exchanged. A pair of tray guides 22a, 22b may be installed in opposite sides for moving the investigating tray 20. The tray guide 22a, 22b may become in a single structure with the moving guide, discussed in FIG. 1, or be connected to the moving guide. A tape reel in which a component tape is wound or a printed circuit board having a concentrated electric components may be placed on the investigating surface 21. The investigating tray 20 may move out of the image obtaining module 11 along the tray guide 22a, 22b. The investigating tray 20 may move to the inputting frame through the inputting hole with the shielding door 14 open, and may be located on the guiding surface after moving along the moving guide. If the tape reel or the printed circuit board is placed on the investigating surface 21, then the investigating tray 20 moves within the image obtaining module 11 with the shielding door 14 open to be fixed at the predetermined position for investigating. And then, the inputting hole may be shielded by the shielding door 14. A locking state of the shielding door 14 may be verified by a locking sensor, and the x-ray tube 112 may be operated.

The x-ray tube 112 may be secured at the position regulating bracket 111 coupled a top surface of the image obtaining module 11. A focus of the x-ray tube 111 may be adjusted on a center of the transferring tray 20 or a centering part of the investigated object by the position regulating bracket 111. Some x-ray may be emitted from the x-ray tube 112 to transmit the object, and the transmitted x-ray may be detected by the flat detector 113. The flat detector 113 may be installed below the transferring tray 20 and have a sensing surface with a section size corresponding to that of the investigating surface 21. Advantageously, the flat detector 113 may be placed at a position close to the transferring tray in vertical direction. Thereby all the components in the investigating surface 21 may be detected by the flat detector 113 without moving any parts of the component counter. The flat detector 113 may have various structures in which the sensing surface may have a sectional size corresponding to that of the investigating sectional area, not limited the above mentioned example.

The flat detector 113 may be placed at an opposite position of the x-ray tube 112. And the total area image to be investigated may be obtained by the flat detector 113, thereby it is not required for the x-ray tube 112 to be focused at the center of the investigated object. The investigated object may be located at any place of the investigating surface 21 for investigation. When one object is investigated, the object may be located at various places based on the center of the investigating surface 21. When a plural of objects is investigated, each object may be separated each other and be located at any place. Thus, the component counter can investigate the object on the investigating surface 21 regardless of the location. The number of the components is counted based on the x-ray image of the object, and the process or result of counting may be displayed on a displaying unit installed on the exterior of the image obtaining module 11. A data processing unit 191 may be installed in the assistant module. The data processing unit 191 can process information of the object or the component, store the processed information, store a component identifying software, and optionally be connected to an internet external server to receive information for identifying the component. And also, the data processing unit 191 may have an operating system software for the component counter.

Figure 3:
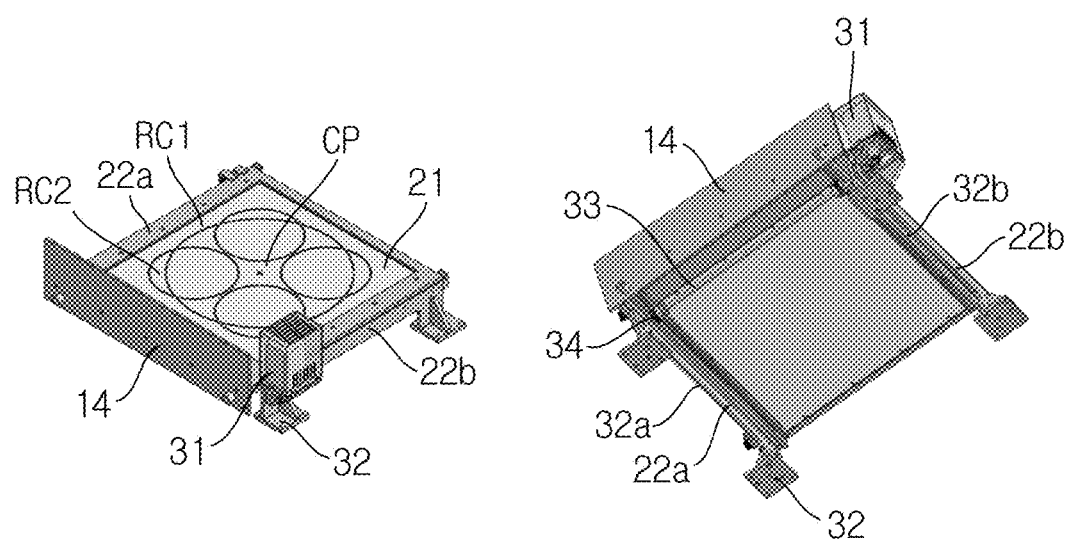
FIG. 3 shows a transferring tray in the component counter according to an embodiment of the present invention.

FIG. 3 shows a transferring tray in the component counter according to an embodiment of the present invention.

Referring to FIG. 3, the component counter comprises a driving means 31 to move the transferring tray 20, and a distortion protecting axle 33 extending along a transverse direction is installed at the transferring tray 20.

A center position CP may be designated on the investigating surface 21, and a first investigating area RC1 may be formed in reference to the center position CP. And a plural of a second investigating area RC2 may be formed in reference to the center position CP. A periphery part may be formed along the periphery of the investigating surface 21, and a pair of tray guide 22*a*, 22*b* may be installed under the periphery part. The pair of tray guides 22*a*, 22*b* may be secured within the image obtaining module by the guide fixing means 32. Linear moving units 32*a*, 32*b* such as a rack gear may be coupled to both opposite bottom sides of the periphery part, and the distortion protecting axle 33 may be installed to connect each front parts of each tray guide 22*a*, 22*b*. And a pair of engaging means 34*a*, 34*b* such a pinion gear for engaging the linear moving units 32*a*, 32*b* may be installed at each end part of the distortion protecting axle 33. A connecting unit 311 such as a bevel gear may be coupled to either of the engaging means 34*b* for transferring a rotation of the driving means 31 such as a motor to the engaging means 34*a*, 34*b*. Thus, the investigating tray may make a round trip between the inputting frame and the image obtaining module by one driving means 31. At same time, the rotation of the driving means 31 may be transferred to the engaging means 34*a*, 34*b* in stable condition by connecting the engaging means 34*a*, 34*b* with the distortion protecting axle 33.

Figure 4A:
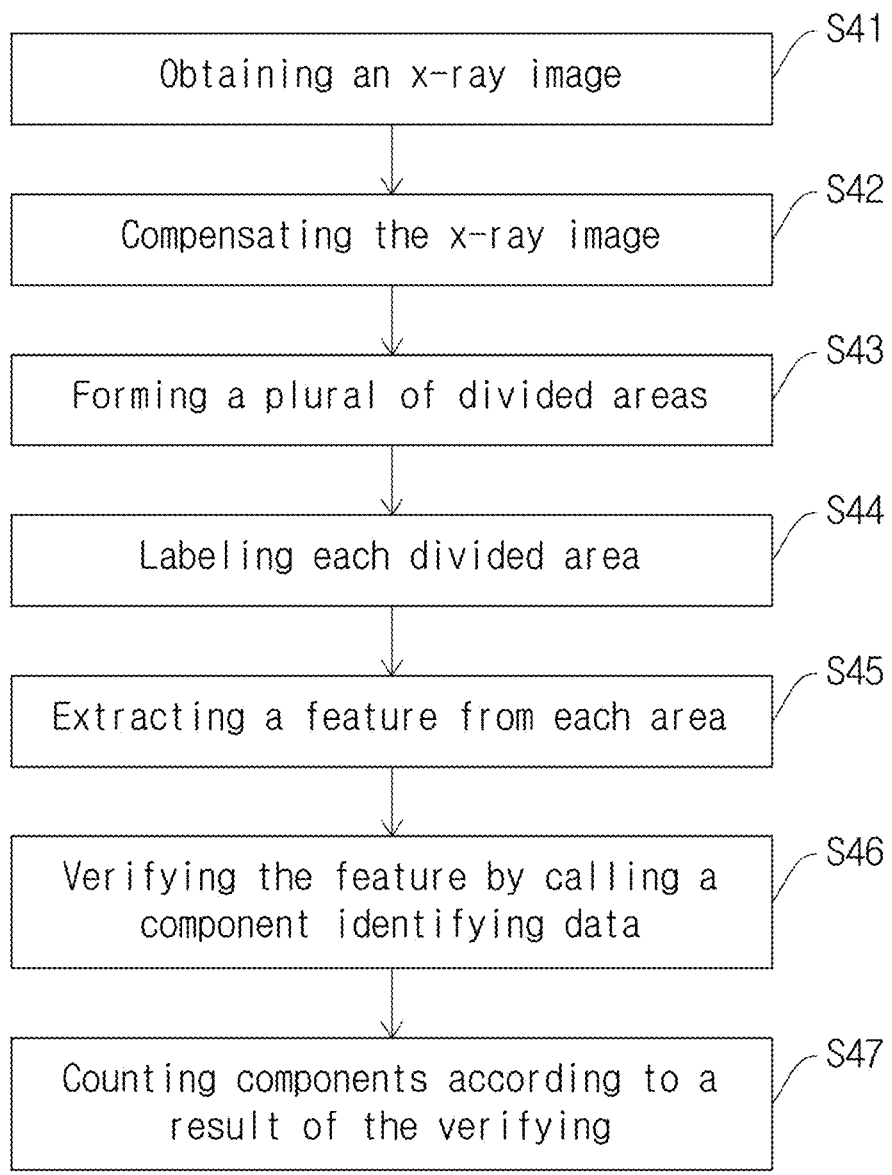
FIG. 4A and FIG. 4B shows a method for counting components according to an embodiment of the present invention.
Figure 4B:
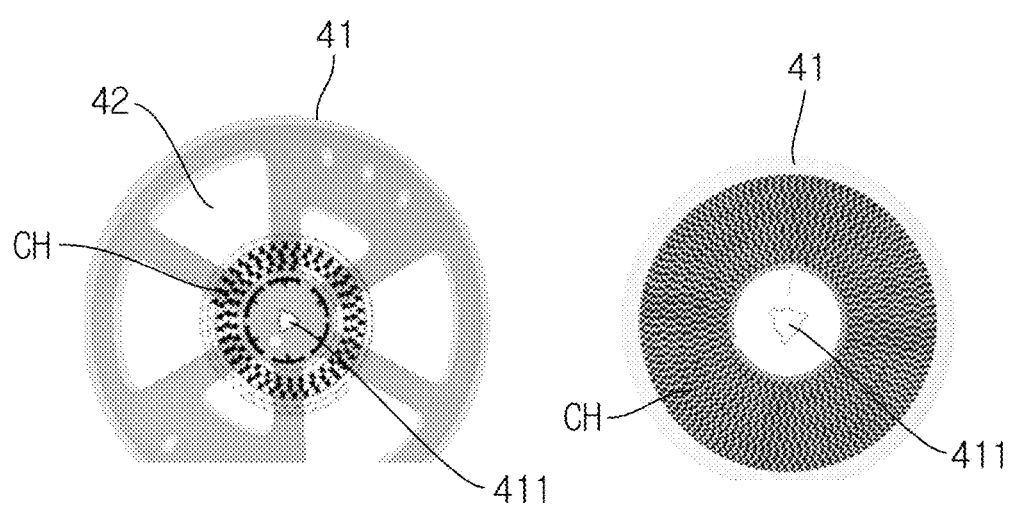

FIG. 4A and FIG. 4B shows a method for counting components according to an embodiment of the present invention.

Referring to FIG. 4A, a method for counting the number of components using x-ray image comprises obtaining an x-ray image S41; compensating the x-ray image S42; forming a plural of divided areas from the x-ray image S43 and labeling each divided area S44; extracting a feature from each area for distinguishing a component S45; verifying the feature of a component or components by calling a component identifying data S46; and counting components according to a result of the verifying S47.

The x-ray image may be obtained the x-ray tube and the flat detector installed within the image obtaining module in S41. If the x-ray image is obtained in S41, the image may be compensated to distinguish the component from the tape or other material in S42. The compensation of the image may comprise removing a high frequency components corresponding to a noise and enhancing a contrast of white and black. Various filters such as a Gaussian blur filter, a mean filter or a median filter or the like may be applied for removing some noise. And various methods such as histogram equalization, a histogram stretching, a contrast limited adaptive histogram equalization may be applied to the image for enhancing the contrast. After applying the filter or the method, a binarization process to the image may be performed to extract some feature of component in S43. Each area of the image may be processed to a white or a black according to the binarization, and then the feature corresponding to the component may be extracted in S43. If a local area binarization is applied to the image, the white area or the black area would be expanded or contracted more than intended. Even though an optimal binary dividing value is applied, some component area cannot be divided exactly. For solving this difficulty, a morphology process may be applied as a post processing for dividing the component area. If the component area is extracted from the compensated image, the labeling processing may be performed in S44. Some adjacent areas may be connected through the labeling process for identifying a blob (binary large object). The adjacent areas may be identified by checking whether some adjacent pixels are coupled, for example, in eight directions or in four directions. If the labeling process of S44 is completed, some feature of each divided area corresponding to the component or components may be extracted in S45. The components may be positioned in various ways in the tape reel or the printed circuit board. Each component may have a different orientation or a deviated place. And also, a plural of components may be positioned very closely to each other as one cluster. And in each case the component has to be identified for counting the number of the components exactly. The component identifying data may be called for checking the various positioning states of the components. Each positioning state may be checked by a convexity, a circularity, a size of an area, a rounding degree, some compact degree, a length of an edge, an ellipse axis or the like. Such feature of the divided area can be extracted in advance. The called data may have information about the various features by learning repeatedly a positioning pattern of the component or by receiving various positioning information from a big data. Thus, the component identifying data can identify whether the extracted feature corresponds to a component or components or not. The process for counting the number of the components may be performed in S47 after identifying the extracted feature. And the result of counting may be displayed on a screen of a displaying unit. The result may comprise the total number of the components in the tape reel or on the printed circuit board, the number of the components to be positioned very closely or the number of the components to deviate from a predetermined position.

FIG. 4B shows a reel tape 41 where a component tape having components CH is wound. The components CH may be positioned continuously and dividedly in the tape. The reel center 411 may be placed on various positions of the investigating surface and an x-ray image of the reel 41 may be obtained. The number of the components CH in the reel 41 may be counted by the method discussed in the above.

What is claimed is:

1. An x-ray detecting type of a component counter comprising:
    an image obtaining module configured to obtain an x-ray image of an object, the image obtaining module having an x-ray tube and a flat detector, wherein the x-ray tube is secured at a position regulating bracket coupled to a top surface of the image obtaining module;
    an inputting frame located at a front of the image obtaining module and having a guiding surface;
    a transferring tray configured to move between the image obtaining module and the inputting frame along a moving guide installed at the guiding surface, wherein the transferring tray has an investigating surface, at least a portion of which is made of a polymer material, and the object is capable of being placed on the investigating surface; and
    a foreign object sensor disposed at the inputting frame and configured to detect a foreign object;
    wherein the flat detector has a horizontal section at least corresponding to the investigating surface of the transferring tray,
    wherein the investigating surface has a first investigating area and a plurality of a second investigating areas which are formed in reference to a center position of the investigating surface, and
    wherein the image obtaining module is configured to obtain the x-ray image of the object by one time operation of the x-ray tube and the flat detector after the transferring tray moves to the image obtaining module.

2. The component counter according to claim 1, further comprising a driving means to move the transferring tray at which a distortion protecting axle extending along a transverse direction is installed.

3. A method for counting a number of components using an x-ray image, the method comprising;
    obtaining an x-ray image using a component counter according to claim 1;
    compensating the x-ray image;
    forming a plural of divided areas from the x-ray image, and labeling each divided area;
    extracting a feature from the each divided area for distinguishing a component;
    verifying the feature of a component or components by calling a component identifying data; and
    counting components according to a result of the verifying.

4. The method according to claim 3, wherein the divided areas are made by means of binarization.

5. The method according to claim 3, wherein the component identifying data is formed using big data learning resources for various component positioning shapes.

* * * * *